United States Patent

[11] 3,548,774

[72] Inventor Mark H. Pease
      Pontiac Township, Oakland County, Mich.
[21] Appl. No. 728,690
[22] Filed May 13, 1968
[45] Patented Dec. 22, 1970
[73] Assignee Jered Industries, Inc.
      Troy, Mich.
      a corporation of Michigan

[54] MARINE STEERING GEAR LINKAGE
      8 Claims, 18 Drawing Figs.
[52] U.S. Cl. .................................................... 114/162
[51] Int. Cl. .................................................... B63h 25/06
[50] Field of Search .......................................... 114/144,
      162, 156, 158, 170, 172; 74/480B, 96; 244/87,
      83.6; 318/20.225

[56]                References Cited
              UNITED STATES PATENTS
2,590,029   3/1952   Minorsky ....................   114/144
  471,202   3/1892   Victor .........................   114/144
1,848,013   3/1932   Hoekstra et al. ...............   244/90
2,958,024  10/1960   Solis ............................   114/144X
                FOREIGN PATENTS
  708,713   5/1931   France .........................

Primary Examiner—Andrew H. Farrell
Attorney—Donnelly, Mentag and Harrington

ABSTRACT: A marine steering gear linkage for controlling the angular position of a ship's rudder comprising a torque multiplying gear unit with a power input element connected drivably to a steering motor and a power output element connected drivably through a driving tiller and a rudder tiller to the rudder shaft, said tillers providing a variable mechanical advantage, the highest mechanical advantage being available when the angular displacement of the rudder is at a maximum and the minimum mechanical advantage being available when the angular displacement is zero, and clutch and brake means including a displacement feedback mechanism for effecting torque delivery to the power input element of the gear unit in one direction or the other, depending upon the direction of movement of the ship's pilot wheel.

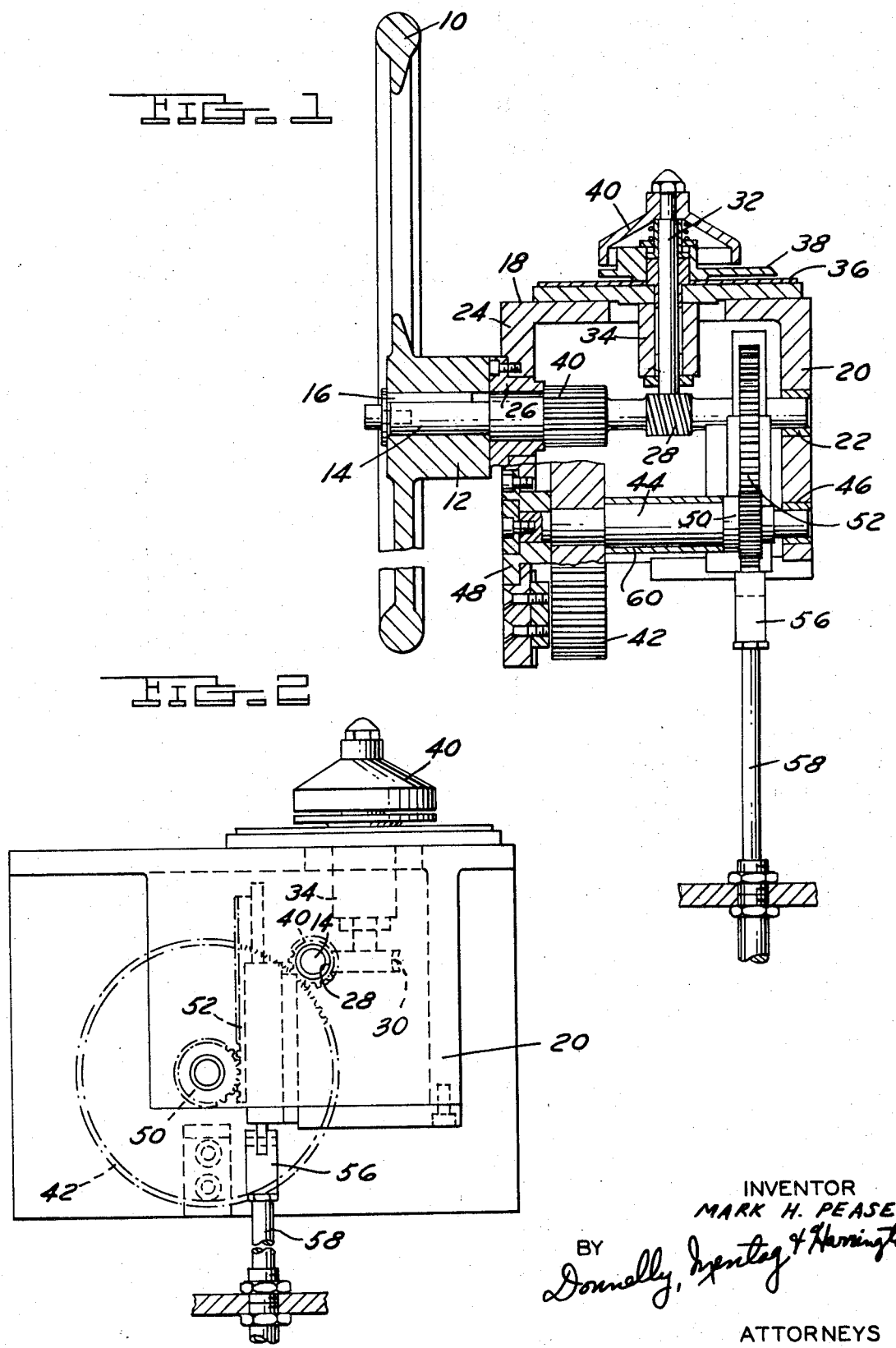

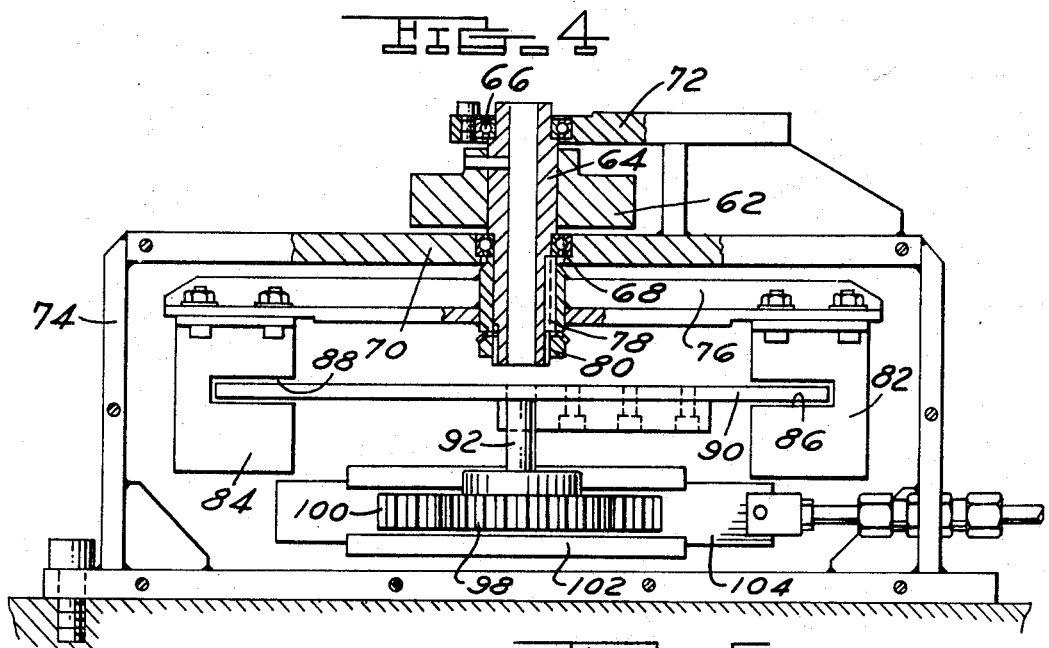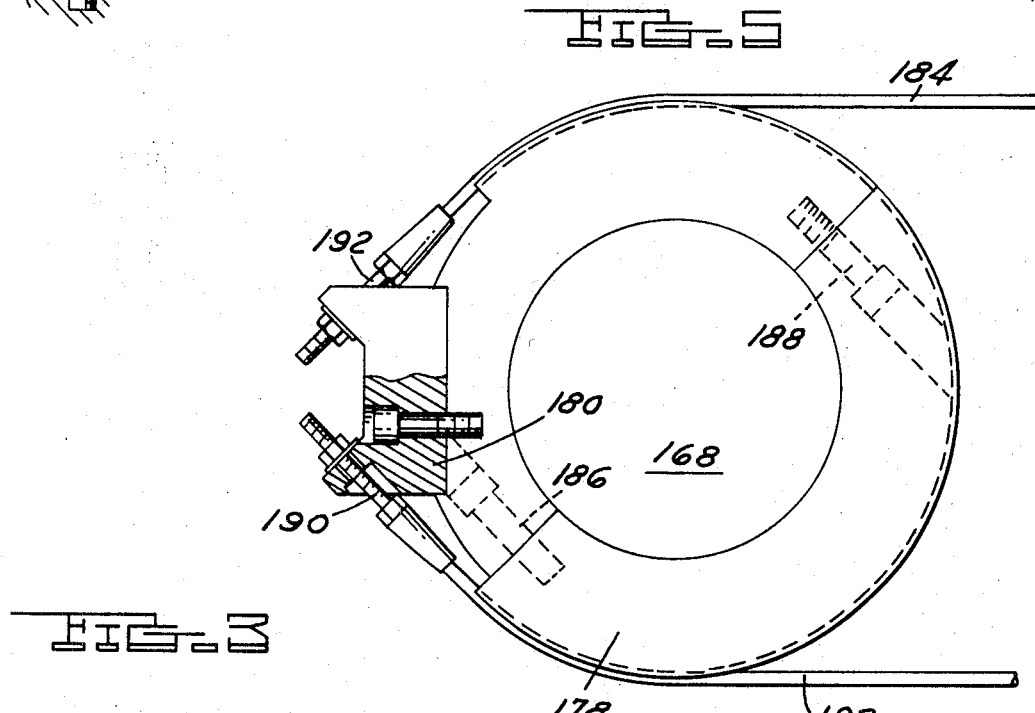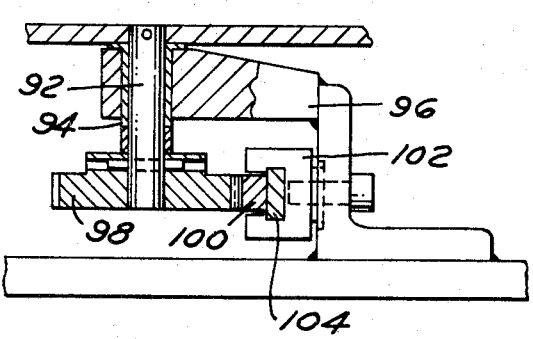

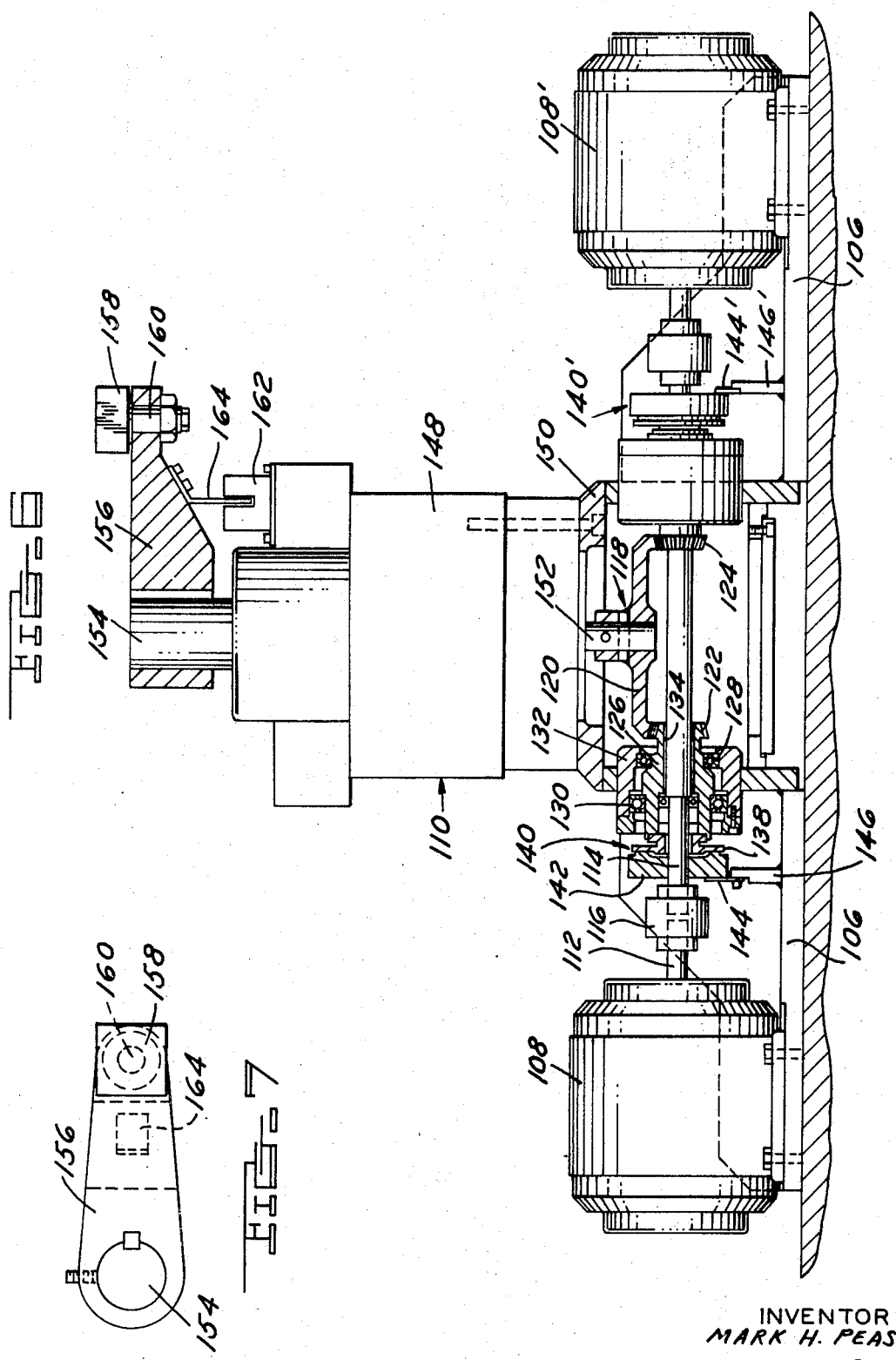

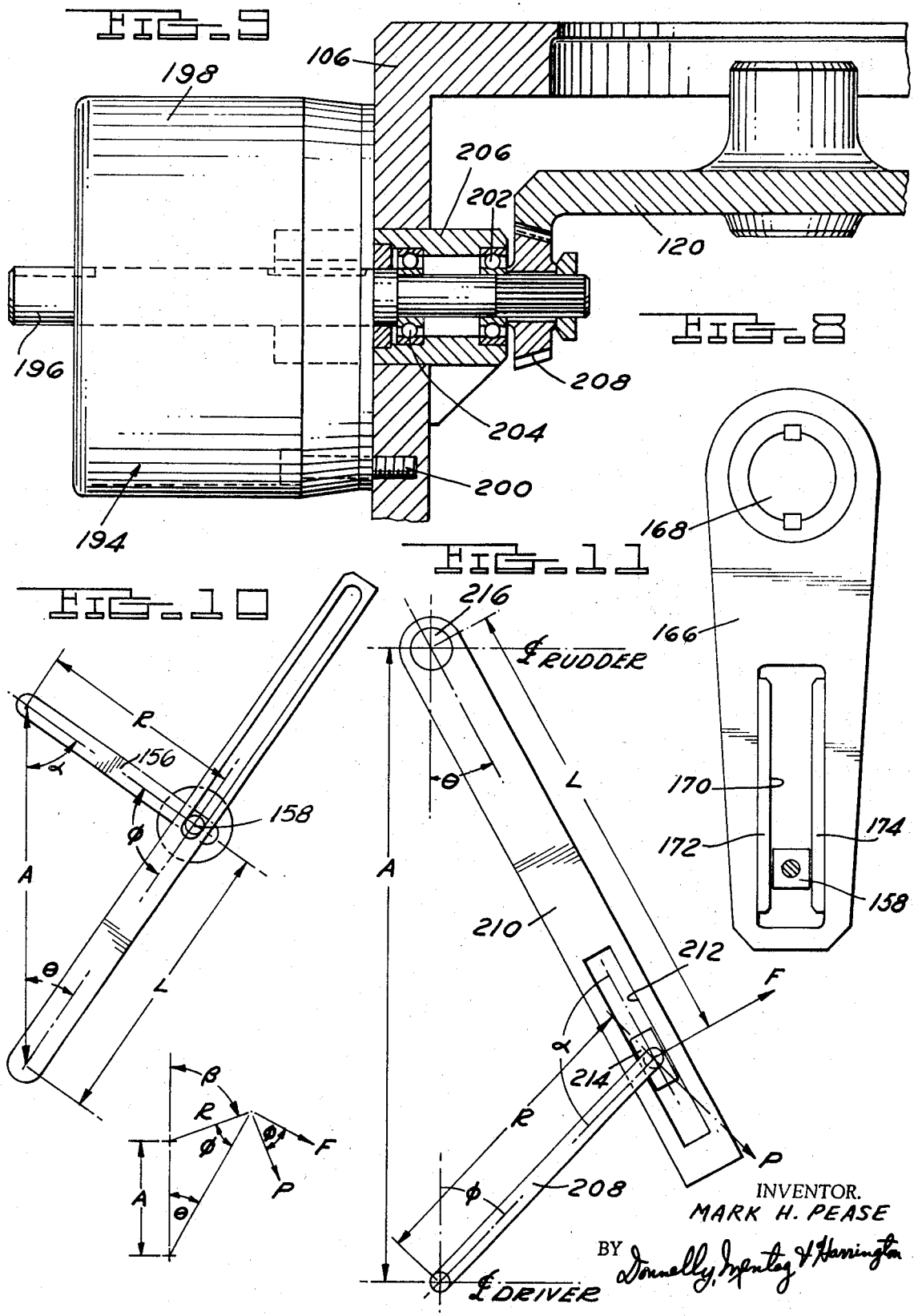

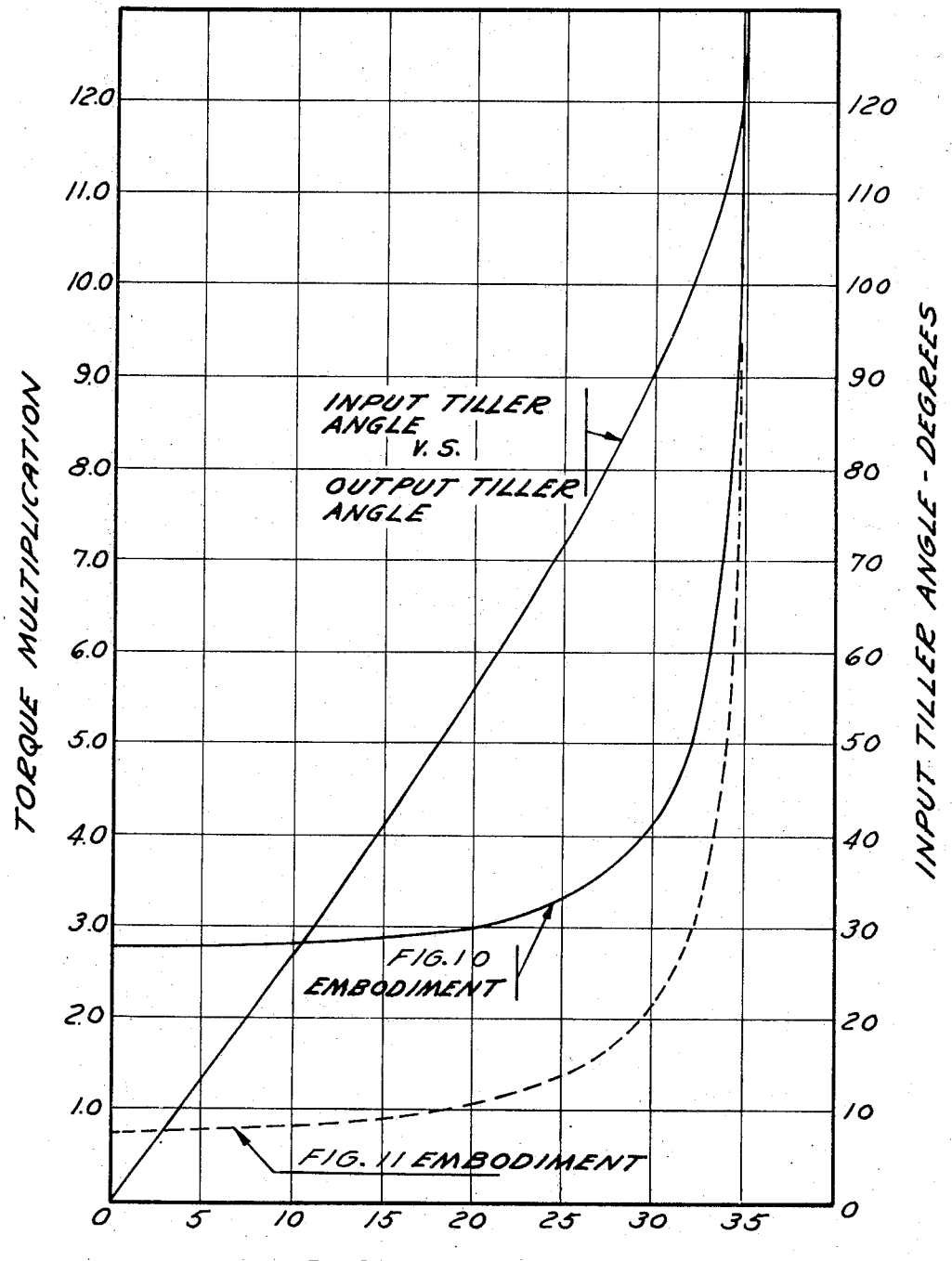

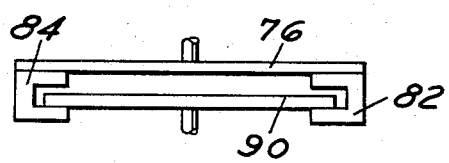
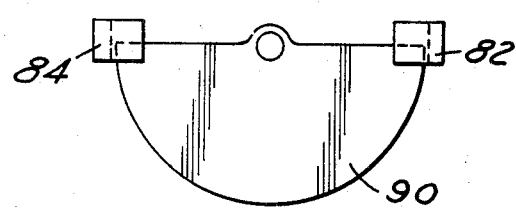
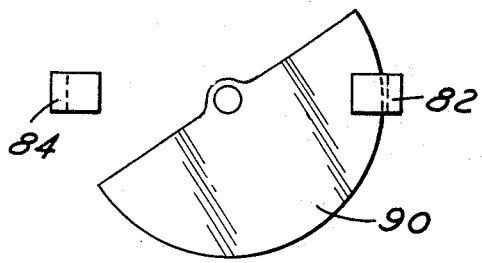
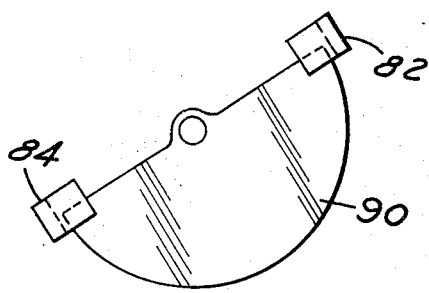
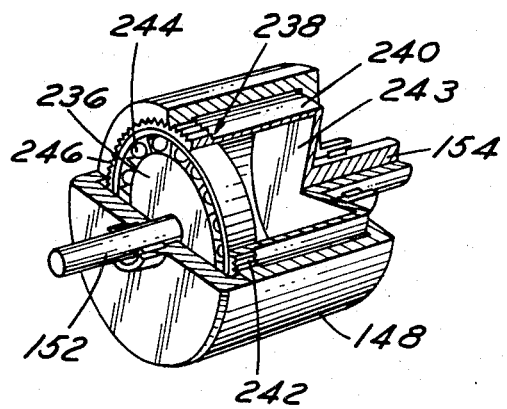
INVENTOR.
MARK H. PEASE 3,548,774

MARINE STEERING GEAR LINKAGE

GENERAL DESCRIPTION OF THE INVENTION

A preferred form of my invention comprises a driving tiller that is connected at one end to the power output element of a high ratio gearing unit. Its other end is connected by means of a bearing block to a rudder tiller, one end of which is connected to a rudder shaft. The effective distance from the bearing block to the axis of rotation of the driving tiller is fixed, although the distance from the axis of the rudder tiller to the bearing block is variable. The latter distance depends upon the angular disposition of one tiller with respect to the other.

When the rudder tiller is in the so-called "hard-over" position, where its effective angle with respect to a line joining the axes of rotation of the tillers is a maximum, the driving tiller tends to assume a normal or perpendicular relationship with respect to the rudder tiller. The angular displacement of the rudder tiller that accompanies any given displacement of the driving tiller at that time is a minimum.

When the rudder tiller assumes a straight ahead position, it is substantially aligned with a line joining the centers of rotation of the tillers. Any incremental displacement of the driving tiller from the neutral position at that time will be accompanied by an equal incremental displacement of rudder tiller. Thus the mechanical advantage in the tiller assembly is a maximum as the rudder assumes the hard-over position and the hydrodynamic forces acting on the rudder are a maximum. Conversely, the magnitude of the hydrodynamic forces acting on the rudder are a minimum when the mechanical advantage of the tiller assembly is a minimum as the rudder tiller assumes a straight-ahead, neutral position.

The use of a tiller assembly having a variable mechanical advantage improves rudder control and makes possible a reduced size for the torque-multiplying gearing for driving the tiller assembly.

In one embodiment the effective distance between the axis of rotation of the rudder tiller to the bearing block is a maximum when the rudder tiller is in a central, neutral position. It is a minimum when the rudder tiller assumes a hard-over position. In a second embodiment of my invention, the converse is true. That is, the distance between the axis of rotation of the rudder tiller and the bearing block is a maximum when the rudder tiller assumes a hard-over position, and is a minimum when the rudder tiller assumes a central, neutral position. In either case, however, the mechanical advantage increases asymptotically as the rudder angle approaches a maximum.

The power input element of the torque-multiplying gearing for driving the driving tiller is connected to an electric motor. Compound clutch and brake means establish a torque transmitting path for delivering torque from the motor to the gearing input element in one direction or the other depending upon the direction of adjustment of the pilot wheel. The pilot wheel is connected drivably to a rotary switch vane and the driving tiller is connected drivably to a cooperating rotary switch disc. Arcuate adjustment of the vane and the disc controls the compound clutch and brake means to effect torque distribution from the motor to the power input gear element thereby causing the driving tiller to rotate. This rotation is fed back through a mechanical feedback system to the rotary switch disc until its original angular position with respect to the pilot wheel operated vane is restored.

Adjustment of the pilot wheel in the opposite direction causes actuation and release of the compound clutch elements in a different pattern, thereby causing torque distribution in the opposite direction. This again is accompanied by a feedback motion to the switch disc until the original relative position of the plates is restored.

An automatic brake which is controlled in cooperation with the compound clutches, anchors the power input element of the gearing whenever a stable condition for the rudder is achieved. This eliminates the possibility of overtravel due to inertia forces in the system following adjustment of the rudder in one direction or the other. It eliminates also feedback motion due to hydrodynamic forces acting on the rudder.

BRIEF DESCRIPTION OF THE FIGURES IN THE DRAWINGS

FIG. 1 shows in cross-sectional form the ship's pilot wheel and the gearing used for transferring rotary motion of the wheel to the rotary vane of the feedback switch system for the clutches.

FIG. 2 is a side elevational view of the structure of FIG. 1.

FIG. 3 shows in cross-sectional form a rack and pinion connection between the pilot wheel operated cable and the movable vane of the switch assembly for the compound clutches.

FIG. 4 shows in longitudinal cross section form a relatively movable switch vane and carrier disc connected respectively to the pilot wheel and to the output element of high-ratio gearing.

FIG. 5 shows a driving sheave for the rudder stock which is associated with the drive cable for the switch carrier disc shown in FIG. 4.

FIG. 6 is an assembly view of the clutch system connecting the driving motor with the power input motor of the high-ratio gearing.

FIG. 7 is a top view of the output element of the structure of FIG. 6.

FIG. 8 is a plan view of the rudder tiller associated with the driving tiller of FIG. 7.

FIG. 9 is a subassembly view showing the automatic brake structure used for anchoring the power input element of the high ratio gearing of FIG. 6.

FIG. 10 is a schematic view representing the geometric relationship between the driving tiller and the rudder tiller for a first embodiment of my invention.

FIG. 11 shows an alternate tiller assembly with a different geometric relationship between the tillers.

FIG. 12 is a chart showing the relationship between the torque multiplication of the tiller assembly and the rudder angle for each of the two embodiments.

FIGS. 13A, 13B, 13C and 13D show in schematic form the angular relationship of the switch vane and the switch carrier vane during various operating modes.

FIG. 15 is a schematic representation of a high ratio gear unit in the form of a "harmonic drive" for connecting drivably the driving motor to the driving tiller.

PARTICULAR DESCRIPTION OF THE INVENTION

Figure 14:
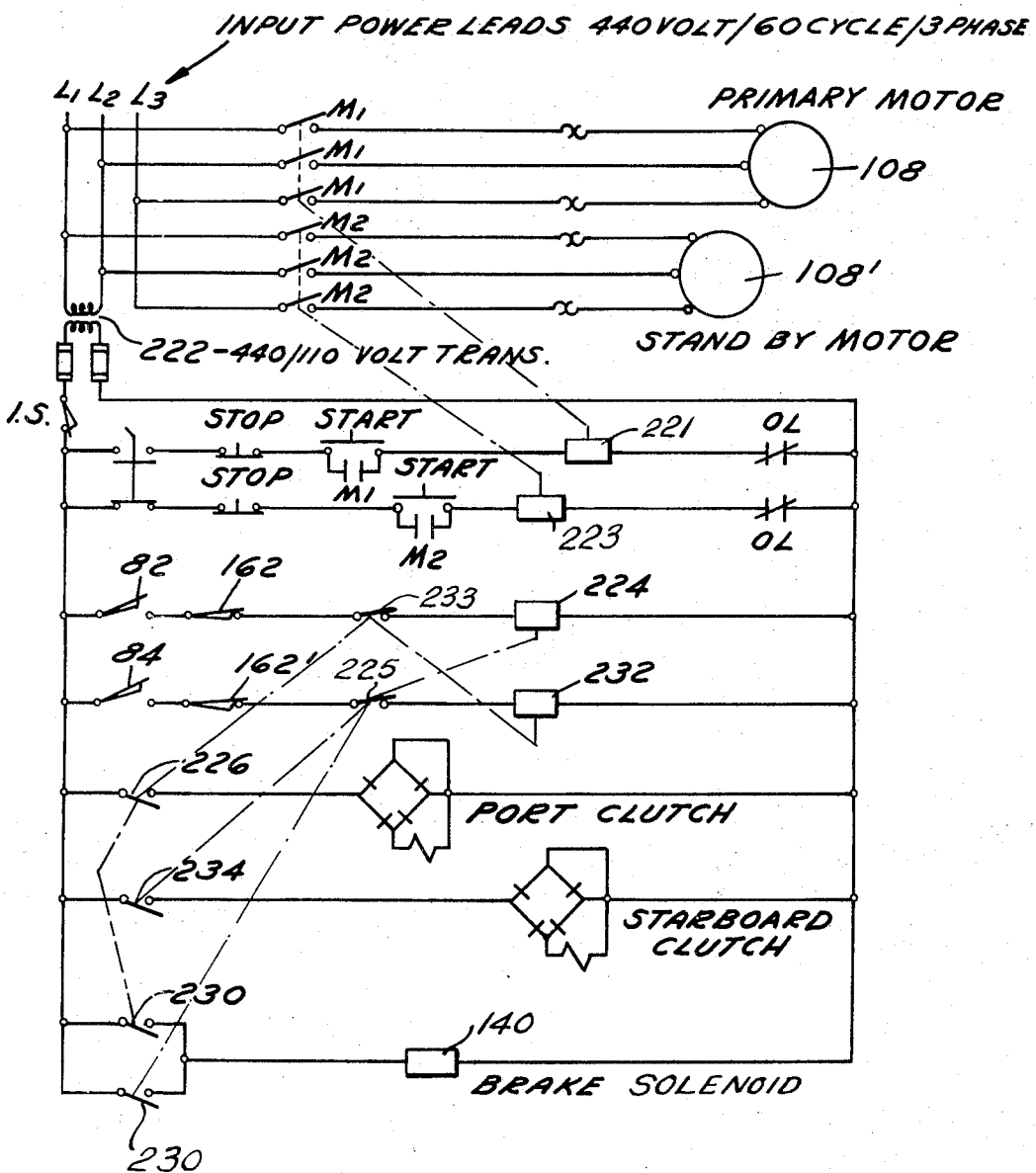
FIG. 14 shows in schematic form the electrical circuitry for the clutch and brake means.

In FIGS. 1 and 2, numeral 10 designates a pilot wheel. Its hub 12 is supported by a pilot wheel shaft 14 and is connected drivably to shaft 14 by a drive key 16. The shaft 14 is supported at spaced locations in a steering assembly housing 18. The right-hand end of the shaft 14 is journaled in sidewall 20 of the housing 18. This sidewall is provided with a bearing opening which receives bushings 22. The end of the shaft is journaled within the bushing 22.

A second wall 24 for the housing 18 has an aperture that receives bushing 26. Shaft 14 is supported near its left-hand end by the bushing 26. An intermediate section of the shaft 14 is provided with a helical pinion 28 and a conjugate, cross-axis, helical gear 30. Gear 30 is joined to a vertical shaft 32 which in turn is mounted in a boss 34 carried by the housing 18. A rudder position indicator dial 36 is secured to the upper surface of the housing 18. The indicator 36 may have arcuate graduations to designate the various ship's rudder positions. Cooperating with the graduations is an indicator pointer 38, which is drivably connected to the shaft 32. A cover 40 shields the indicator.

The indicator thus registers the position of the ship's wheel 10 as the shaft 14 is driven.

Shaft 32 has formed thereon a drive pinion 40 which meshes with a driven gear 42. Gear 42 is connected drivably to a countershaft 44. This is end supported in the housing walls 20 and 24. The right-hand end of the shaft 44 is received in a bushing 46 carried in an opening in the wall 20. The left-hand end of the shaft 44 is received within bushing 48 secured in an opening in the wall 24.

A second gear 50 also is connected to the shaft 44 which engages a rack 52. The rack 52 is slidably supported by a guide secured to the housing 18. The rack 52 is connected by means of a coupling 56 to a control cable 58. A spacer sleeve 60 surrounds the shaft 44 at a location between the gears 42 and 50.

Upon rotation of the pilot wheel 10, the cable 58 is moved in either one direction or the other depending upon the direction of rotation of the wheel 10.

Pulley 62 in FIG. 4 is connected to a rotary shaft 64 and supported by spaced bearings 66 and 68. These bearings are received in bearing openings formed in bearing support walls 70 and 72. These walls form a part of a feedback assembly housing 74.

A rotary switch disc 76 is keyed at its hub to the shaft 64, a suitable key and slot connection 78 being provided for this purpose. The disc 76 is held in place by a retainer nut 80 threaded to the end of the shaft 64.

The disc 76 carries at radially spaced locations two magnetic switches 82 and 84. These are formed with recesses 86 and 88 respectively. A switch vane 90 is mounted in generally parallel disposition with respect to the disc 76. The margin of the vane 90 is received within the recesses 86 and 88. The vane is made of magnetic material, and it is formed with a generally segmental shape. The arcuate extent of the margin of the vane is sufficient to cause it to enter recesses 86 and 88 simultaneously, at which time both switches 82 and 84 are open. If the vane 90 should move arcuately with respect to the disc 76, either one switch or the other will move out of registry with respect to the vane depending upon the direction of movement. The switch that moves out of registry with respect to the vane closes. The switches 82 and 84 are of well known construction and their functions will be described subsequently with reference to FIGS. 13A, 13B, 13C and 13D and 14.

The vane 90 is mounted for rotation about an axis that coincides with the axis of rotation of the shaft 64. The hub of the vane 90 is connected drivably to shaft 92. This shaft is journaled in a bushing 94 formed in a bearing opening in boss 96. This in turn is secured to the base of the housing 74.

The shaft 92 is pinned or otherwise connected to a gear 98. The gear registers with the teeth on a sliding rack 100. This is in turn supported for longitudinal motion by a guide housing 102, which is secured to the boss 96. The rack 100 engages a suitable slide block 104.

The rack 100 and the gear 98 form a vane drive for the vane 90. The rack 100 is connected mechanically to control cable 58. Thus when the wheel 10 is moved in one direction or the other, the resulting linear motion of the rack 100 is translated to rotary motion of the vane 90.

The main steering engine elements are shown in FIG. 6. This includes a main housing support 106, an electric drive motor 108 and a high ratio gearing unit 110.

The electric motor 108 is secured firmly to the base 106, a suitable flange and bolts being provided for this purpose. An armature shaft 112 of the electric motor 108 is connected drivably to clutch input shaft 114 by means of a flexible coupling 116.

A differential right angle drive is shown generally at 118. It includes a bevel ring gear 120, which uses a power output element for the drive 118 and the two coaxial power input bevel gears 122 and 124. Gear 122 is formed with an elongated hub 126. This is journaled by spaced ball bearings 128 and 130 in bearing adapter 132. The hub 126 and the gear 122 are formed with a central opening 134 through which shaft 114 extends. Shaft 114 is journaled at one end thereof by a bearing received within the opening 134.

The left-hand end of the hub 126 carries clutch output member in the form of an armature disc 138. This armature disc is journaled rotatably on the shaft 114 and is connected directly to the hub 126. Armature 138 forms a part of an electromagnetic clutch 140. This includes field windings in member 142 which can be energized as will be explained subsequently. As it is energized, the armature 138 becomes locked to the member 142, thereby establishing a driving connection between armature shaft 112 and the gear 122 through the clutch 140 and the shaft 114. When the windings of member 142 are deenergized, gear 122 becomes disconnected from the armature shaft 112. A torque reaction arm 144 for the outer housing of member 142 is situated on one side of the member 142 and is supported by boss 146.

Gear 124 is similar to gear 122. It is formed with central openings through which shaft 114 extends. It cooperates with a clutch 140′ that resembles the clutch 140. The clutch 140′ is adapted to connect selectively the gear 124 to the motor driven shaft 114. The motor 108 can be duplicated on the right-hand side of FIG. 6 as indicated by the symbol 108′. Both motors 108 and 108′ may be similar in construction, and they both apply torque to the shaft 114 in the same direction. Use of duplicate motors is a safety feature which assures that driving torque will be available to the ship's rudder even though an electrical malfunction might occur that would disable one of the motors.

When the clutch 140 is disengaged and the clutch 140′ is engaged, bevel gear 124 becomes the driving member and bevel gear 122 becomes an idler. The functions of the bevel gears 122 and 124 are interchanged, however, when the clutch 140 is energized and the clutch 140′ is deenergized. When bevel gear 124 is a driver, the output ring gear is driven in one direction. It is driven in the opposite direction, however, when bevel gear 122 is the driving member. Thus driving torque can be distributed in one direction or the other to the power input element of the high ratio gearing 110.

The gearing is contained within a housing 148 which is formed with a flange 150. This in turn is welded or otherwise permanently secured to the main support 106. The gear 118 is drivably connected to power input shaft 152 for the high ratio gearing 110.

The output shaft for the high ratio gearing 110 is shown at 154. It is connected to a driving tiller 156. The radially outward end of the driving tiller 156 carries a sliding bearing block 158, preferably of bronze. It is joined to the tiller 156 by a bolt 160. An overtravel limit switch 162 is secured to the housing for the high ratio gearing 110. When the arcuate motion of the tiller 156 reaches one extreme position, a switch trigger 164 actuates the switch 162, thereby interrupting the circuit for the switches that control the clutches 140 and 140′. These clutches will be referred to as a port clutch and a starboard clutch, respectively, in the description that will accompany FIG. 14.

FIG. 8 shows a rudder tiller at 166. It is keyed to a rudder stock 168. The radially outward end of the tiller 166 is formed with a slot 170 extending along the geometric axis of the tiller 166. Steel guideways 172 and 174 are situated on either side of the slot 170. Located in the slot 170 between the steel guideways 172 and 174 is the bronze sliding block 158.

As indicated in FIG. 5, the rudder stock 168 has directly connected thereto a driving sheave 178. It carries a block 180 to which are connected the ends of a pair of control cables 182 and 184. The driving sheave 178 may be formed in two parts which surround the rudder stock 168. The parts can be joined together by clamping bolts 186 and 188. The sheave 178 can be formed with a groove which receives the cables 182 and 184 and holds them against displacement. The cable ends are secured to the block 180 by convenient threaded adapters 190 and 192, which provide for manual adjustment.

The cables 182 and 184 are trained over driven sheave 62. Thus rotation of the rudder stock will effect adjustment of the driven sheave 62 and the associated switch disc 76. This provides a feedback motion from the rudder to the rotary switch disc.

Adjustment of the pilot wheel 10 will effect rotary adjustment of the vane 90. This will actuate and deactuate the switches 82 and 84 to effect appropriate engagement and release of the electromagnetic clutches 140 and 140′. Driving torque of the electric motors then is magnified by the high ratio gearing and distributed to the driving tiller. Rotation of the driving tiller effects adjustment of the rudder tiller and the rudder stock. As soon as this arcuate adjustment occurs, the motion of the rudder stock is transferred through the motion feedback cables 182 and 184 to the sheave 62, which effects adjustment of the disc 76. This tends to restore the original position of the disc 76 with respect to the vane 90. After this original position is restored, the clutches are again deactuated and motion of the rudder stock ceases. Adjustment of the vane 90 by the pilot wheel in one direction will cause one switch to close while one of the others remains open. Adjustment of the pilot wheel in the opposite direction will cause the other switch to close while the one switch remains open. Thus adjustment of the rudder stock is dependent upon the direction of motion of the ship's pilot wheel.

After the original neutral position of the switch disc with respect to the vane is restored, it is desirable to anchor the power input shaft 152. This is done by means of the brake assembly shown in FIG. 9.

This brake assembly includes an electric disc brake 194 which comprises multiple discs carried by brake shaft 196. These register with relatively stationary discs carried by brake housing 198. This housing is secured by bolts 200 to the support 106.

The brake shaft 196 is journaled by means of spaced bearings 202 and 204 in a bearing housing 206. One end of the brake shaft 196 carries pinion 208 which meshes with the differential ring gear 120. Thus when the brake shaft 196 is anchored, the power input shaft 152 is braked.

As will be explained subsequently, brake 194 is activated whenever the electromagnetic clutches are released. Brake application occurs under the influence of spring pressure. The brake is released against the opposing influence of spring pressure when the electromagnetic clutches are applied.

The spring-applied brake 194 prevents overtravel of the rudder stock due to inertia forces in the steering system after the electric motor drive to the power input element of the high ratio gearing is discontinued. Furthermore, the brake, which is energized whenever the driving motors are inactive, prevents torque feedback from the rudder through the high ratio gearing due to the hydrodynamic forces acting on the rudder.

In FIG. 10 I have shown in schematic form the geometric relationship between the driving tiller, the rudder stock and the rudder tiller. The distance between the axis of oscillation of the rudder stock and the axis of oscillation of the driving tiller is represented by the symbol "A." The distance between the axis of the rudder stock and the bearing block 158 is represented by the symbol "L." This distance is variable depending upon the angular position of the driving tiller. The angular position of the rudder tiller with respect to the driving tiller is designated by the symbol "Φ." The displacement of the rudder tiller is designated by the angle "θ" and the displacement of the driving tiller is designated by the angle "α."

When the angle α is 180°, the angle θ is 0°. At that time the mechanical advantage in the linkage system is a minimum.

When the angle Φ approaches 90°, the mechanical advantage tends to approach infinity. This is the position illustrated in FIG. 10, which corresponds to the "hard-over" rudder position. The torque imparted to the rudder stock is equal to the component of the force applied by the bearing block to the rudder tiller in a direction normal to the rudder tiller times the dimension L.

In FIG. 11, I have illustrated an alternate linkage arrangement which might be used in an environment of this type. In this case the driving tiller 208 assumes the normal position with respect to the rudder tiller when the dimension L is a maximum. This is in contract to the FIG. 10 embodiment where the dimension L is a minimum when the driving tiller assumes a normal position.

In the FIG. 11 embodiment, the rudder tiller 210 is provided with a slot and bearing guide 212 which receives bearing block 214. This bearing block is carried by the end of driving tiller 208. The end of the rudder tiller 210 is joined drivably to the rudder stock 216.

The angle Φ, which is the angular displacement of the driving tiller, is a maximum when the mechanical advantage of the linkage system of FIG. 11 is a maximum. As the angle Φ and the angle θ, which represents the angular position of the rudder tiller, approach zero, the mechanical advantage approaches its minimum value. At that time the dimension L, which is the effective length of the rudder tiller, is a minimum.

In the FIG. 11 embodiment, the effective lever arm L of the rudder tiller is a maximum when the mechanical advantage is a maximum. Thus the total torque multiplication available with the linkage of FIG. 11 for any given displacement of the driving tiller will differ from the corresponding torque multiplication that might be obtained with the construction of FIG. 10.

The relationship of rudder angle in degrees to torque multiplication for each embodiment is shown in FIG. 12. In each instance, as the rudder angle increases, the mechanical advantage approaches infinity.

In FIGS. 13A, 13B, 13C and 13D, I have shown in schematic form the relative motion pattern for the switch and the switch disc illustrated in FIG. 4. FIG. 13A shows the vane 90 registering with the magnet switches 84 and 82. FIGS. 13B, 13C and 13D are plan view of the structure of FIG. 13A. In FIG. 13B the vane 90 and the disc 76, which carries the switches 82 and 84, are in a neutral position. With the vane cooperating with both switches at that time, both switches are open.

When the vane 90 is rotated upon rotation of the pilot wheel in the manner previously described, it will assume the position shown in FIG. 13C. Motion of the pilot wheel in the opposite direction of course, will cause rotation of the vane 90 in the opposite direction. When the vane and the disc are in the relative positions shown in FIG. 13C, switch 84 is closed so switch 82, which still registers with the vane, remains open. This will cause engagement of the electromagnetic clutch 140 associated with the switch 84, thereby causing the disc to rotate with a followup motion. This is done in the manner previously described as input torque from the driving motor is distributed through the harmonic drive and into the driving tiller. The resulting motion of the driven tiller is fed back to the rotary switch disc until the disc assumes the relative position shown in FIG. 13D. At that time the vane 90 again registers with switch 84 and switch 84 opens.

FIG. 14 shows a schematic diagram of the circuitry for controlling the clutches and the brakes. It includes a pair of electric motors 108 and 108', one of which is the primary motor and the other of which is a standby motor for emergency purposes. They are controlled by contacts M1 and M2 respectively, which in turn are actuated by relays 221 and 223, respectively.

The input power leads are shown at L1, L2 and L3. They energize the primary windings of stepdown transformer 222. One side of the switch 82 is connected to one side of the secondary of transformer 222. One side of the switch 84 also is connected to that same side. When switch 82 is closed, relay 224, which is connected to the opposite side of the transformer 222, becomes energized. This opens contact 225 and closes a contact 226 for the port clutch and a contact 230 for the electric brake. When the port clutch is energized, it distributes torque to the input element of the gearing. The driven tiller begins to rotate until the relay 224 is deenergized by the opening of switch 82 or until overtravel switch 162 is opened.

Switch 84 causes relay 232 to become energized as it is closed. This opens contact 233 and causes a contact 234 for the starboard clutch and the other contact 230 for brake 140 to become closed. The resulting motion of the driven tiller will eventually open switch 162' when switch 84 is opened or when the limiting position is reached, thereby deenergizing relay 232. If displacement of the switch vane is less than the limiting displacement, motion of the driven tiller will continue until one of the switches moves into registry with the vane, thereby opening either switch 82 or 84, as previously described.

Normally closed relay switch contacts A and B are in the parallel circuits for the relays 232 and 224. These provide an interlock between the relays whereby contacts A are opened when relay 224 is energized and contacts B are opened when relay 232 is energized.

In FIG. 15, I have illustrated in schematic form the principal elements of the high ratio gearing 110. The input shaft 152 is connected directly to a wave generator, which may be in the form of a double-lobed cam, as shown at 236. This is journaled for rotation about the common axis of the shaft 152 and 154. It is positioned within a flex-spline 238 which includes a flexible drum 240. One margin of the drum 240 is provided with external spline teeth 242. The other margin of the drum is connected to a drive plate 243 which is secured at its hub to the shaft 154.

The flex-spline is deflected by the wave generator. For this purpose caged ball bearings 244 are disposed between the margin of the ellipse shaped generator 236 and the spline 242. The flex-spline then is brought into meshing engagement with internal spline teeth 246 formed in the housing 148.

The internal spline teeth are slightly greater in number than the number of external spline teeth. The overall ratio that is achieved is equal to the number of teeth in the flex-spline divided by the difference in the number of teeth in the internal circular spline and in the flex-spline. For a more complete description of the mode of operation of the gearing of FIG. 15, reference may be made to U.S. Pat. No. 2,906,143.

I claim:

1. A marine steering gear linkage mechanism comprising: a rudder stock, a rudder tiller connected to said rudder stock, a driving tiller, a bearing connection between one end of said driving tiller and said rudder tiller including a bearing carried by said driving tiller, said bearing registering with said rudder tiller and movable toward and away from the pivot axis of said rudder tiller as said driving tiller is moved angularly, the distance between the center of oscillation of said rudder tiller and said bearing connection being a maximum when angular displacement of said rudder tiller with respect to any reference line drawn between the centers of oscillation of said tillers is a minimum, the angular displacement of said rudder tiller with respect to said reference line being a maximum when said driving tiller assumes a normal position with respect to said rudder tiller, a rudder stock driving motor, high ratio gearing having an output element connected to said driving tiller, and torque delivery elements forming a torque delivery path between said motor and torque input elements of said gearing.

2. A steering gear linkage mechanism for a marine vessel, comprising: a rudder stock, a rudder tiller connected to said rudder stock, a driving tiller, a connection between said driving tiller and said rudder tiller including a bearing carried by said driving tiller and a bearing guideway in said rudder tiller whereby said bearing is adapted to move radially with respect to said rudder stock in registry with said rudder tiller, said rudder tiller assuming a maximum rudder stock displacement position when said driving tiller assumes a generally normal position with respect to said rudder tiller, high ratio gearing including a torque input member and a torque output member, said torque output member being connected to said driving tiller, a motor means for driving said torque input member, a bipartite torque delivery path comprising a driven gear connected to said torque input member, two driving pinions engaged with said driven gear, selectively engageable clutch means for connecting said motor means to each of said driving pinions whereby said driven gear is driven in one direction as one pinion is connected to said motor means through said clutch means and wherein said driven gear is driven in the opposite direction when the other pinion is connected through said clutch means to said motor means.

3. A marine steering assembly comprising: an electric motor, a rudder stock, a driven tiller connected to said rudder stock, a driving tiller, high ratio gearing including a torque input shaft and a torque output shaft, said torque output shaft being connected to said driving tiller, one end of said driving tiller carrying a bearing, a guideway formed in said driven tiller and receiving said bearing whereby said driving tiller drives said driven tiller with a variable mechanical advantage, the mechanical advantage being at maximum when the angular disposition of said driving tiller with respect to said driven tiller approaches the normal, a forward-driving, geared, torque-delivery path between said motor and said torque input shaft, a reverse-driving, geared torque-delivery path between said motor and said torque input shaft, separate electrically controlled clutch means in each torque delivery path for selectively completing and interrupting each torque delivery path, an electrical potential source, electrical circuitry including paired switch means for connecting said potential source to said clutch means including a personally controllable member forming an element of each switch means, a feedback driving connection between said rudder tiller and a companion movable member of said switch means, one of said paired switch means being open and the other closed upon movement of said personally controllable member in one direction, and the other switch means being open and said one switch means being closed upon movement of said personally movable member in the opposite direction.

4. The combination set forth in claim 3 wherein said circuitry includes also a connection between said motor and said potential source, said feedback driving connection having portions situated in and partly defining said circuitry and adapted to sense the angular position of said rudder stock and to deenergize said motor when said rudder stock assumes a predetermined position.

5. A steering gear linkage mechanism for a marine vessel, comprising: a rudder a rudder tiller connected to a rudder stock, said driving tiller, a variable linkage connection between said driving tiller and said rudder tiller including a bearing carried at one end of said driving tiller and a bearing guideway in said rudder tiller whereby said bearing is adapted to move radially with respect to said rudder stock in registry with said rudder tiller, said rudder tiller assuming a maximum rudder stock displacement position when said driving tiller assumes a generally normal position with respect to said rudder tiller, high ratio gearing including a torque input member and a torque output member, a driving motor, a bipartite torque delivery path comprising a driven gear connected to said torque input member, two driving pinions connected to said driven gear, separate selectively engageable, electrically controlled clutch means for connecting said motor to each of said driving pinions whereby said driven gear is driven in one direction as one pinion is connected to said motor through its clutch means and wherein said driven gear is driven in the opposite direction when the other pinion is connected through its clutch means to said motor, and brake means for anchoring said torque input element when both of said clutch means are deenergized to provide a torque reaction for said torque input member that prevents reverse torque delivery through said high ratio gearing.

6. A marine steering assembly comprising: an electric motor, a rudder stock, a driven tiller connected to said rudder stock, a driving tiller, high ratio gearing including a torque input member and a torque output shaft, said torque output shaft being connected to said driving tiller, one end of said driving tiller carrying a bearing block, a guideway formed in said driven tiller and receiving said bearing block whereby said driving tiller drives said driven tiller with a variable mechanical advantage, the mechanical advantage being a maximum when the angular disposition of said driving tiller with respect to said driven tiller approaches the normal, a forward-driving, torque-delivery path between said motor and said torque input member, a reverse-driving, torque-delivery path between said motor and said torque input member, separate electrically controlled clutches in each torque-delivery path for selectively completing and interrupting a driving connection between said motor and said torque input member, an electrical potential source, electrical circuitry including separate switch means connecting said electrical potential source to each clutch means including a personally controllable member forming an element of said switch means, a feedback driving connection between said rudder tiller and a companion movable member of said switch means, one switch means being open and the other closed upon movement of said personally controllable member in one direction, and the other switch means being open and said one switch means being closed upon movement of said personally movable member in the opposite direction, and brake means for anchoring said torque input element when both of said clutch means are deenergized to provide a torque reaction for said torque input member that prevents reverse torque delivery through said high ratio gearing.

7. A steering gear linkage mechanism as defined in claim 5, wherein said brake mean comprises a pinion connected drivably to said driven gear, a brake shaft connected to said pinion, a friction brake member carried by said brake shaft, a cooperating friction member carried by a relatively stationary portion of said mechanism, means normally urging said friction members into braking engagement, and means for deactivating said brake means as either of said clutch means is energized.

8. A marine steering assembly as defined in claim 6, wherein said brake means comprises a pinion connected drivably to said driven gear, a brake shaft connected to said pinion a friction brake member carried by said brake shaft, a cooperating friction member carried by a relatively stationary portion of said mechanism, spring means normally urging said friction members into braking engagement, and electromagnetic means for deactivating said spring means as either of said clutch means is energized.

UNITED STATES PATENT OFFICE
CERTIFICATE OF CORRECTION

Patent No. 3,548,774     Dated December 22, 1970

Inventor(s) MARK H. PEASE

It is certified that error appears in the above-identified patent and that said Letters Patent are hereby corrected as shown below:

Column 5, line 33, after "rudder" first occurrence, insert -- stoc same line, "a", third occurrence, should be -- said;
line 34, "said" should be -- a --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents